US008584825B2

(12) United States Patent
Arnault

(10) Patent No.: US 8,584,825 B2
(45) Date of Patent: Nov. 19, 2013

(54) CLUTCH BEARING, A CLUTCH DRIVE DEVICE, AND A MOTOR VEHICLE EQUIPPED WITH SUCH A BEARING AND WITH SUCH A DEVICE

(75) Inventor: Benoit Arnault, Saint Cyr sur Loire (FR)

(73) Assignee: Aktiebolaget SKF, Göteborg (SE)

( * ) Notice: Subject to any disclaimer, the term of this patent is extended or adjusted under 35 U.S.C. 154(b) by 180 days.

(21) Appl. No.: 13/129,779

(22) PCT Filed: Nov. 16, 2009

(86) PCT No.: PCT/EP2009/065208
§ 371 (c)(1),
(2), (4) Date: Jul. 1, 2011

(87) PCT Pub. No.: WO2010/055151
PCT Pub. Date: May 20, 2010

(65) Prior Publication Data
US 2011/0259705 A1    Oct. 27, 2011

(30) Foreign Application Priority Data

Nov. 17, 2008    (FR) ...................................... 08 57802

(51) Int. Cl.
*F16D 25/08* (2006.01)
*F16D 23/14* (2006.01)

(52) U.S. Cl.
USPC .......................................... 192/98; 192/85.51

(58) Field of Classification Search
USPC .............. 192/110 B, 98, 55.61, 85.51, 85.52; 384/612
See application file for complete search history.

(56) References Cited

U.S. PATENT DOCUMENTS 4,881,629 A *  11/1989 Gay et al. .......................... 192/98
2002/0097940 A1 *  7/2002 Arnault et al. ................. 384/612

FOREIGN PATENT DOCUMENTS

| DE | 19716473 A1 | 10/1998 |
| DE | 19908148 A1 | 8/2000 |
| EP | 1367283 A1 | 12/2003 |
| FR | 2577291 A1 * | 8/1986 |
| FR | 2740193 A1 | 4/1997 |
| GB | 1421029 A | 1/1976 |
| JP | 2002340026 A | 11/2002 |

OTHER PUBLICATIONS

Machine Translation of Arnault (FR2740193A1), hydraulic operating system for clutch in motor vehicle, 1997, 29 pages.*
Machine Translation of Yasuaki (JP2002-340026), hydraulic clutch release device, 2002, 18 pages.*

* cited by examiner

*Primary Examiner* — Rodney Bonck
*Assistant Examiner* — Lillian Nguyen
(74) *Attorney, Agent, or Firm* — Bryan Peckjian; SKF USA Inc. Patent Department

(57) ABSTRACT

This bearing forms a clutching-declutching thrust bearing for a motor vehicle and comprises an inner ring, an outer ring and rolling elements. A flange mounted on the inner ring is equipped with two crenellated series of flange segments extending radially on the same side of a cylindrical web of the flange, and being offset angularly about an axis of symmetry of the inner ring, and axially along said axis. In addition to the bearing, the device further includes a control device, provided with a stationary portion and with a moving portion mounted to move axially and suitable for moving the bearing relative to the clutch mechanism, and a protective bellows disposed between the stationary portion and the bearing. The flange segments define between them an annular volume for receiving and for clamping one edge of the bellows.

10 Claims, 3 Drawing Sheets

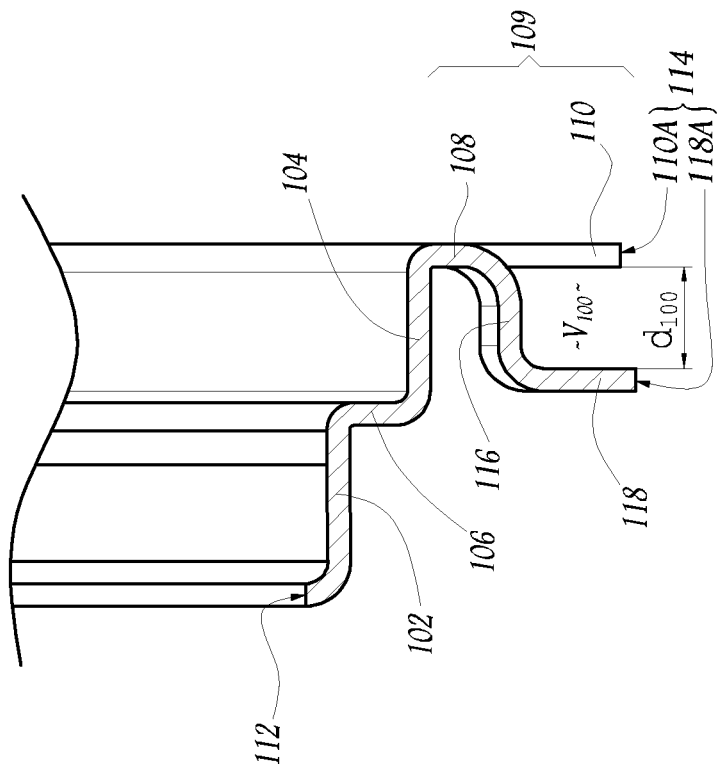
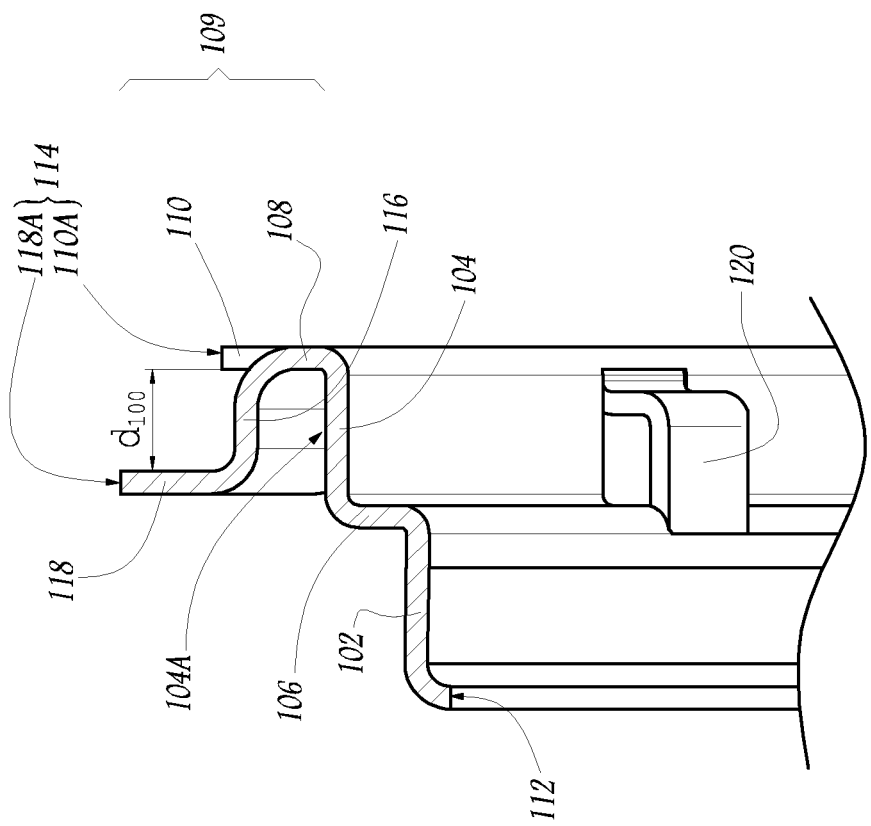

CLUTCH BEARING, A CLUTCH DRIVE DEVICE, AND A MOTOR VEHICLE EQUIPPED WITH SUCH A BEARING AND WITH SUCH A DEVICE

BACKGROUND OF THE INVENTION

The present invention relates to a bearing forming a thrust bearing for a clutch for a motor vehicle. The invention also relates to a clutch device including a bearing of the above-mentioned type. Finally, the invention relates to a motor vehicle equipped with such a bearing or with such a clutch device.

In the automotive industry, it is known to use a bearing comprising an inner ring, an outer ring, and rolling elements for constituting a clutching-declutching thrust bearing making it possible to control a diaphragm spring that is part of a declutching mechanism that is known per se. Such a bearing can be incorporated into a clutch drive device as is known, for example, from FR-A-2 740 193. In that device, a bellows is used for isolating from the outside the portions that move relative to one another from the outside, in particular a control piston for causing the inner ring of the bearing to move axially, and a pre-stressing spring for pre-stressing the bearing. In order to perform its function effectively, that bellows must be prevented from moving relative to one of the rings of the bearing, namely, in the example given in that document, the inner ring which is prevented from moving in rotation about its axis of symmetry. One end of the bellows is clamped by a band held in an annular groove provided in the outside diameter of a link part made of a molded synthetic material. The band is also made of a synthetic material and the use of two parts makes the function of fastening the end of the bellows both complex and costly. In addition, putting the band into place in the groove in the link part requires a specific assembly step, which increases the cost of the above-mentioned function and requires qualified labor.

In addition, it is known from JP-A-2002 340026 that a bearing can be equipped with a flange that is provided firstly with locking tongues designed to co-operate with a piston and, secondly with abutments for stopping a bellows heel in a single direction. The bellows is not held stationary on the flange, thereby presenting a risk of accidental disassembly. The bellows is therefore not durably in place.

SUMMARY OF THE INVENTION

An object of the invention is to remedy those drawbacks more particularly by proposing a novel bearing forming a clutching-declutching thrust bearing, with which it is easier and less costly to put one edge of a protective bellows into place.

To this end, the invention provides a bearing forming a clutching-declutching thrust bearing for a motor vehicle, said bearing comprising an inner ring, an outer ring and rolling elements disposed between the inner and outer rings. This bearing is characterized in that a flange mounted on the inner ring is equipped with two crenellated series of flange segments extending radially on the same side of a cylindrical web of the flange, said flange segments being offset angularly about an axis of symmetry of the inner ring, and axially along said axis.

By means of the invention, the two series of flange segments, which are offset both angularly and axially, define between them an annular volume making it possible to receive and to clamp the edge of a protective bellows belonging to a clutch drive device. The two series of flange segments can be made in a metal part which is less voluminous than a part made of a molded synthetic material, and which has resilience that can be used for imparting to the flange segments a function of clamping the edge of a bellows between them.

In advantageous but non-essential aspects of the invention, such a bearing may incorporate one or more of the following characteristics, taken in any technically feasible combination:

- the two series of flange segments extend radially outwards relative to the cylindrical web segment;
- the two series of flange segments define between them a volume suitable for receiving one edge of a bellows;
- the flange is made of metal, and the series of flange segments are obtained by localized cutting out and folding of a radially outer portion of the flange;
- the flange segments of a first series of flange segments extend radially in prolongation of an annular portion of the flange that is perpendicular to an axis of symmetry of the flange, while the flange segments of the second series of flange segments are parallel to the flange segments of the first series and are obtained by folding certain angular zones of the radially outer portion of the flange at 90°, in two opposite directions;
- the flange is provided with a punched out portion that projects radially, towards the axis of symmetry of the inner ring, from a cylindrical portion of the flange centered on said axis. This punched out portion may serve to receive the end of an end turn of a spring;
- the flange is mounted on the inner ring by being held stationary thereon both in rotation and in axial translation, relative to the axis of symmetry of the inner ring;
- there are six flange segments in the first series, and each of them extends over a sector of an angle of about 30° about the axis symmetry of the flange and there are six flange segments in the second series, and each of them extends over a sector of an angle of about 30° about the axis of symmetry; and
- the flange includes a second annular portion parallel to the annular portion from which the flange segments of the first series extend radially in prolongation, said second annular portion forming a surface suitable for receiving the end turn of a spring bearing thereagainst.

The invention also provides a clutch drive device comprising: a bearing as mentioned above, said bearing being capable of acting on a diaphragm spring of a clutch mechanism; a control device provided with a stationary portion and with a moving portion mounted to move axially relative to the stationary portion and suitable for moving the bearing relative to the clutch mechanism; and a protective bellows disposed between the stationary portion and the bearing. This device is characterized in that the two series of flange segments define between them an annular volume for receiving and for clamping one edge of the bellows.

Advantageously, the flange forms a bearing zone for a spring exerting an axial force on the inner ring. In which case, the flange is provided, in the bearing zone for the spring, with a piece in relief for locking the spring and the flange in rotation. It is possible to make provision for said piece in relief to be formed by a punched-out portion in the flange.

In another advantageous aspect of the invention, a control member for controlling the axial position of the bearing is mounted in self-centering manner relative to the inner ring.

Finally, the invention provides a motor vehicle equipped with a bearing or with a drive device as mentioned above.

Such a vehicle is cheaper to manufacture and easier to maintain than prior art vehicles, in particular when work is to be done on the clutch bearing, by disuniting the clutch bearing from a protective bellows and by re-uniting said bearing with said bellows.

BRIEF DESCRIPTION OF THE SEVERAL VIEWS OF THE DRAWINGS

The invention can be better understood and other advantages of the invention appear more clearly from the following description of an embodiment of a bearing and of a clutch drive device that comply with the principle of the invention, this description being given merely by way of example and with reference to the accompanying drawings, in which:

FIG. 5 is a view on a larger scale of the portion of the flange of FIGS. 3 and 4 that can be seen in the top portion of FIG. 2; and FIG. 6 is a view on a larger scale of the flange portion that can be seen in the bottom portion of FIG. 2.

DETAILED DESCRIPTION OF THE INVENTION

Figure 1:
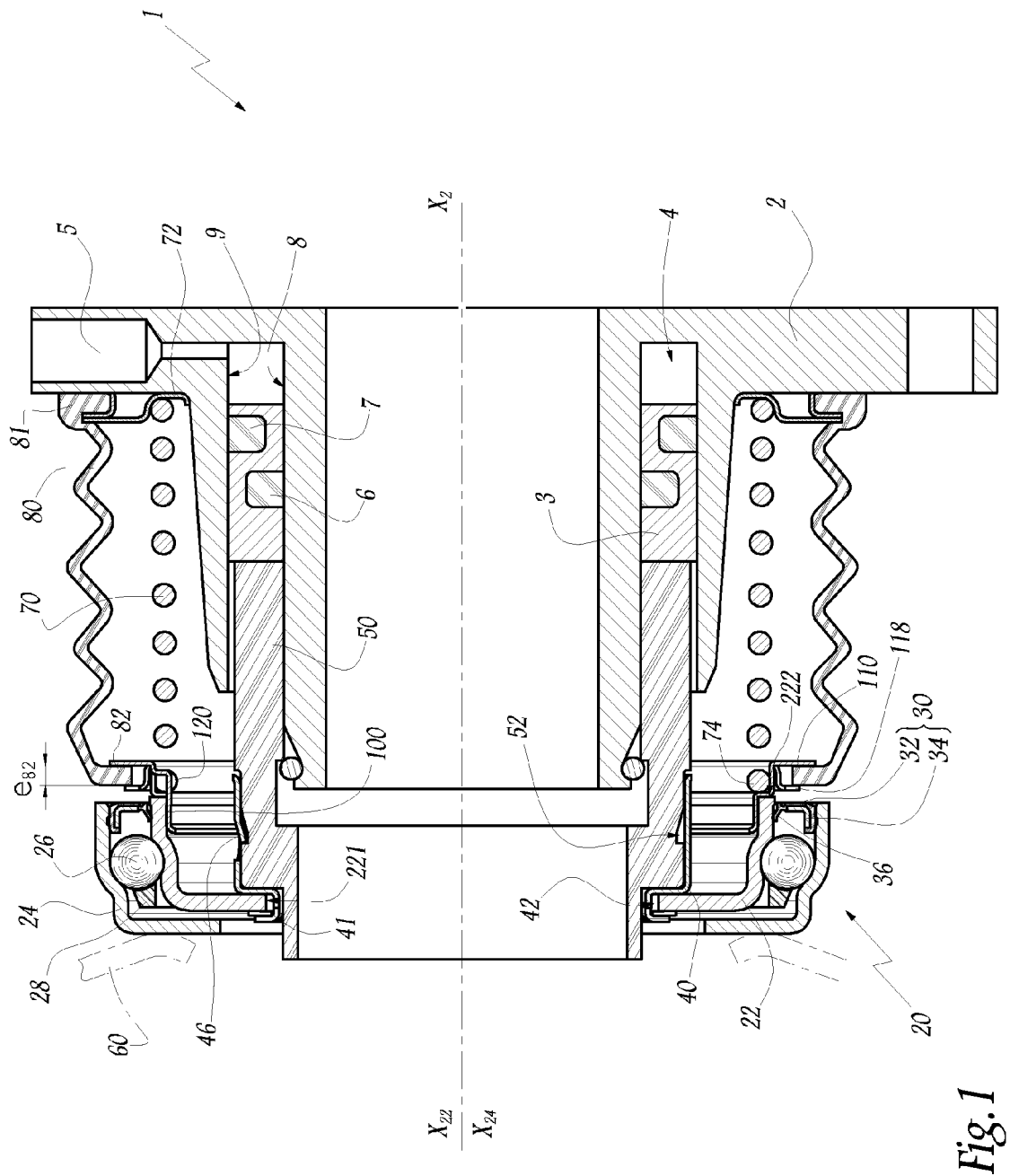
FIG. 1 is a schematic axial section view of a drive device of the invention that incorporates a bearing of the invention.
Figure 4:
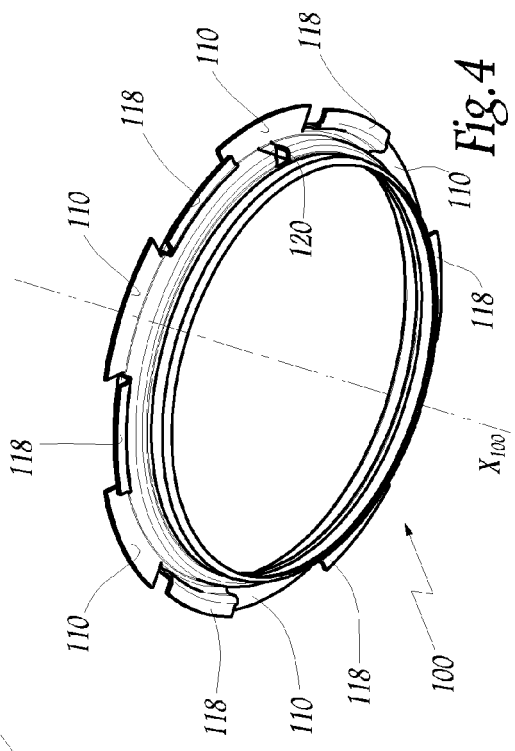
FIG. 4 is a perspective view of the flange of FIG. 3, from another angle.

The device 1 shown in FIG. 1 includes a hydraulic control subassembly that includes a stationary support 2, in general mounted on the casing of a gearbox (not shown). The control subassembly also includes a piston 3 received entirely inside an annular chamber 4 provided in the support 1 and designed to receive a control hydraulic fluid fed in via a fitting 5. The piston 3 is equipped with two sealing gaskets 6 and 7 in contact respectively with the radially inner wall 8 and with the radially outer wall 9 of the chamber 4.

The device 1 also includes a bearing 20 forming a clutching-declutching thrust bearing having its inner ring referenced 22 and its outer ring referenced 24. A series of balls 26 are held in position, in the volume defined between the rings 22 and 24, by means of a cage 28.

The axes of symmetry of the rings 22 and 24 are referenced respectively $X_{22}$ and $X_{24}$, these axes coinciding with each other when the bearing 20 is in the assembled configuration.

The bearing 20 also includes a gasket 30 that extends radially relative to the axes $X_{22}$ and $X_{24}$ between the rings 22 and 24, this gasket comprising a metal reinforcement 32 and an elastomer body 34, and being anchored to the ring 24 and provided with a lip 36 that bears slidably against the ring 22.

A metal sleeve 40 is mounted on the ring 22 and it is designed to be fastened to a thrust element 50 whose axial position, along an axis $X_2$ defined by the support 2 and coinciding with the axes $X_{22}$ and $X_{24}$ when the device 1 is in the assembled configuration, is controlled by the piston 3.

The sleeve 40 is mounted in such a way as to allow for its radial displacement relative to the ring 22. More precisely, the sleeve 40 is provided with tabs 41 that define an outer zone 42 for receiving the radially inner edge 221 of the ring 22, with radial clearance, so that the edge 221 can slide radially in the zone 42. This allows the relative positions of the parts 22 and 40 to be adjusted perpendicularly to the axis $X_{22}$. This makes it possible to accommodate misalignment of the axis $X_{22}$ and of the central axis $X_{40}$ of the sleeve 40 when these axes are parallel but do not coincide.

A conical ring 44 disposed between the tabs 41 and the edge 221 performs the function of contributing to guaranteeing a continuous axial preload between the ring 22 and the sleeve 40, even during any relative radial self-centering movements therebetween. By means of the radial clearance between the edge 221 and the zone 42, the sleeve 40 is mounted in self-centering manner on the ring 42.

In addition, the sleeve 40 is provided with punched out portions 46 enabling it to be fasten in an external peripheral groove 52 in the thrust element 50, thereby guaranteeing that a thrust force is transmitted effectively between the piston 3 and the sleeve 40. The geometrical shape of the sleeve 40 at the zone 42 makes it possible to transmit the thrust force to the edge 221, this force being transmitted, between the ring 22 and the ring 24, via the balls 26.

In practice, the ring 22 is prevented from rotating about the axis $X_{22}$, whereas the ring 24 rotates about the axis $X_{24}$, at a speed that depends, in particular, on the engine speed.

The ring 24 is in abutment against a diaphragm spring 60 that is shown in part in chain-dotted lines that show its tips and that is part of a declutching mechanism, that is known per se and that is not described in any further detail.

A spring 70 is installed between the support 2 and the ring 22 and exerts thereon a resilient preloading force, directed towards the diaphragm spring 60. On the same side as the support 2, the spring 70 bears against a metal washer 72 that is secured to or integral with the support 2.

A bellows 80 is mounted around the elements 4, 6, 50, and 70 in order to isolate them from the outside. One edge 81 of the bellows 80 is clamped by the washer 72 against the support 2.

A flange or thrust ring 100 is mounted in tight-fitting manner on the ring 22, and it enables the edge 82 of the bellows that is further from the washer 72 to be received.

The flange 100 is made of steel, by die stamping and cutting out. The flange 100 includes a cylindrical web 102 centered on an axis $X_{100}$ that coincides with the axis $X_{22}$ in the configuration in which the flange 100 is mounted on the ring 22. The flange 100 includes a second cylindrical web 104 that is also centered on the axis $X_{100}$ and that is connected to the web 102 via an annular portion 106 that is perpendicular to the axis $X_{100}$. The webs 102 and 104 are circular in section.

The web 102 and the portion 106 are dimensioned so as to enable the flange 100 to be locked resiliently by friction inside the radially outer edge 222 of the ring 22, so that, once in place on this edge, the flange 100 is secured to the ring 22 so that is constrained both to move in rotation therewith about the axis $X_{22}$ and to move in translation therewith parallel to said axis.

The flange 100 also has an annular portion 108 that is parallel to the portion 106 and thus perpendicular to the axis $X_{100}$. This portion 108 extends the web 104 at the end thereof that is opposite from the portion 106.

Figure 3:
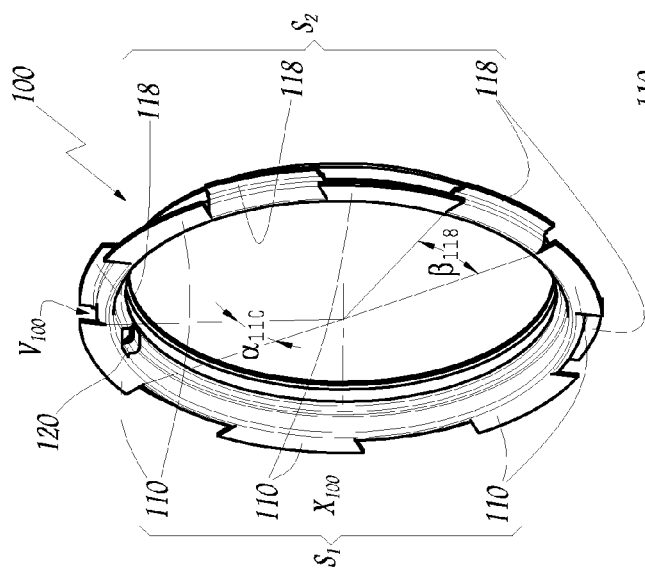
FIG. 3 is a perspective view of a flange that is part of the bearing of FIG. 2.
Figure 2:
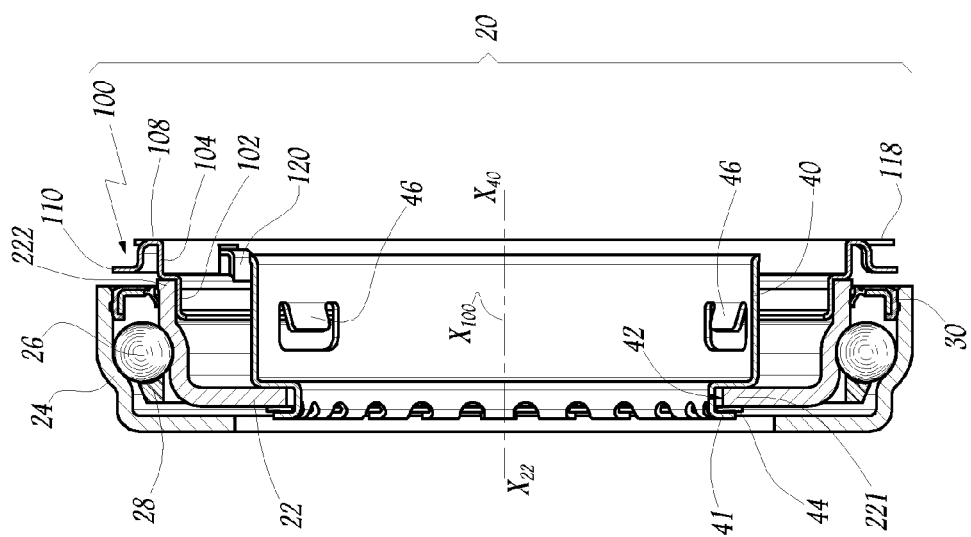
FIG. 2 is an axial section view of the device of FIG. 1, in a plan offset angularly relative to the plane of FIG. 1.

Starting from the portion 108, a first crenellated series $S_1$ of flange segments 110 extend radially relative to the axis $X_{100}$ towards the outside starting from the portion 108. As can be seen in FIG. 3, there are six flange segments and, each of them extends over a sector of an angle $\alpha_{110}$ of about 30° about the axis $X_{100}$.

The radially inner edge of the flange 100 is referenced 112, and its radially outer edge is referenced 114.

Between two adjacent flange segments 110, the portion 108 is folded over at about 90° towards the radially outer surface 104A of the web 104 so as to form a cylindrical web segment 116 parallel to the web 104. Opposite from the portion 108, each web segment 116 is folded over in the opposite direction relative to the fold formed between the portions 108 and 116, so that six other flange segments 118 are formed that belong to a second crenellated series $S_2$ of flange segments, each of these flange segments extending about the axis $X_{100}$ over a sector of an angle $\beta_{118}$ of about 30°, and each of said flange segments extending radially outwards relative to the segment 116 of which it constitutes the end, and being parallel to the adjacent flange segments 110.

Thus the two series $S_1$ and $S_2$ of crenellated flange segments 110 and 118 extend radially, relative to the axes $X_{22}$ and $X_{100}$ that coincide when the bearing is in the assembled configuration, on the same side of each cylindrical web segment 116, namely outwards relative thereto. If an imaginary cylindrical surface $S_{116}$ of a cylinder having a circular base, which surface contains the radially outer surfaces of the web segments 116, is considered, then the series $S_1$ and $S_2$ of crenellated flange segments 110 and 118 extend radially outwards relative to the surface $S_{116}$, at either axial end thereof.

The edge 114 is formed by associating the free edges 110A of the flange segments 110 with the free edges 118A of the flange segments 118. The series $S_1$ and $S_2$ of the crenellated flanges segments 110 and 118 are thus formed at the edge 114.

The portion of the flange 100 that is situated radially outside the web 104 is referenced 109. This portion 109 comprises the portions 108, 110, 116, and 118. The crenellated flange segments 110 and 118 are formed by localized cutting out and folding of the portion 109.

The flange segments 110 and 118 belong to respective ones of the two crenellated series $S_1$ and $S_2$ by being offset angularly relative to one another about the axis $X_{100}$ and the axis $X_{22}$ in the configuration in which the flange 100 is mounted on the ring 22. In addition, the flange segments 110 and 118 are offset axially by a distance $d_{100}$ along the axes $X_{100}$ and $X_{22}$, due to the axial length of the segments 116.

The two series of flange segments 110 and 118 define between them an annular volume $V_{100}$ for receiving the edge 82 of the bellows 80. The volume $V_{100}$ is situated radially outside the segments of cylindrical web 116 parallel to the web 104 and outside the surface $S_{116}$. The axial distance $d_{100}$ between two adjacent flange segments 110 and 118, i.e. the axial width of the volume $V_{100}$, is chosen to be slightly less than the axial thickness $e_{82}$ of the edge 82, so that, once received in the volume $V_{100}$, the edge 82 is resiliently clamped between said flange segments. Thus, it is not necessary to use an auxiliary part for holding the edge 82 of the bellows 80 stationary on the flange 100.

At the portion 106, the flange 100 forms a bearing surface for the end turn 74 of the spring 70, on the same side as the bearing 20. In other words the resilient force exerted by the spring 70, is applied to the portion 106 of the flange 100 and, through it, to the edge 222 of the ring 22.

A punched-out portion 120 is formed in the flange 100, more precisely by pushing back a small portion of the web 104 towards the axis $X_{100}$. This punched-out portion 120 receives the free end of the end turn 74 of the spring 70 bearing thereagainst, which makes it possible to prevent the flange 100 from moving in rotation relative to the spring 70. In view of the possible friction inside the bearing 20, it cannot be ruled out that the ring 22 might be driven in rotation due to the rotation of the ring 24. Regardless of the direction in which the ring 22 rotates, the punched-out portion 120 then ends up coming to bear against the end of the turn 74, thereby stopping the rotation of the flange 100 and, since said flange is mounted in tight-fitting manner on the ring 22, preventing the ring 22 from rotating.

In aspects of the invention that are not shown, the flange can be prevented from rotating on the ring 22 by means of co-operating shapes, e.g. by being equipped with thin grooves co-operating with ribs provided in the inside surface of the ring 22.

In addition, the number of crenellated flange segments and the sector angle through which each of the flange segments extends could be greater than or less than the values indicated for the embodiment described above.

The invention is shown with a clutch control device having a hydraulic control subassembly. However, it is applicable to a control device controlled by a fork or by any other equivalent mechanism.

A motor vehicle equipped with a bearing, such as the bearing 20, or with a device, such as the device 1, is cheaper to manufacture than prior art vehicles, given how easy it is put the bellows 80 into place, and it is easier to maintain, for the same reason.

The invention claimed is:

1. A clutching-declutching thrust bearing for a motor vehicle, the bearing comprising:
    an inner ring having an axis of symmetry,
    an outer ring, and
    a plurality of rolling elements disposed between the inner and outer rings, and
    a flange mounted on the inner ring and including a generally cylindrical web segment with inner and outer sides and two crenellated series of flange segments extending radially from a same one of the inner and outer sides of the cylindrical web segment, each series of flange segments being offset angularly about the inner ring axis of symmetry from the other series of flange segments and the two series of segments being spaced apart axially from each other, wherein the two series of flange segments define a space configured to receive one edge of a bellows, wherein the flange has a first annular portion, a first one of the two series of flange segments extending radially from the first annular portion, and the flange includes a second annular portion parallel to the first annular portion, the second annular portion forming a surface adapted to receive an end turn of a spring bearing against the flange.

2. The bearing according to claim 1, wherein the two series of flange segments extend radially outwards relative to the cylindrical web segment.

3. The bearing according to claim 1, wherein the flange is made of metal, and the two series of flange segments are formed by cutting and folding a radially outer portion of the flange.

4. The bearing according to claim 3, wherein the flange has an axis of symmetry, the flange web segment has an annular portion extending generally perpendicular to the flange axis of symmetry, the flange segments of a first one of the two series of flange segments extend radially from the web annular portion, and the flange segments of a second one of the two series of flange segments are generally parallel to the flange segments of the first series and are formed by folding angular zones of the radially outer portion of the flange at 90° in two opposite directions.

5. The bearing according to claim 1, wherein the flange has a cylindrical portion generally centered on the axis of symmetry of the inner ring and a punched out portion that projects radially from the cylindrical portion and towards the axis of symmetry of the inner ring.

6. The bearing according to claim 1, wherein the flange is mounted on the inner ring so as to be substantially stationary both rotationally and axially relative to the axis of symmetry of the inner ring.

7. The bearing according to claim 1, wherein the flange has an axis of symmetry, a first one of the two series of flange segments has six flange segments each extending about 30° about the axis symmetry of the flange, and a second one of the two series of flange segments has six flange segments each extending about 30° about the axis of symmetry.

8. A clutch drive device comprising:
a thrust bearing including an inner ring having an axis of symmetry, an outer ring, and
a plurality of rolling elements disposed between the inner and outer rings, and a flange mounted on the inner ring and including a generally cylindrical web segment with inner and outer sides and two crenellated series of flange segments extending radially from a same one of the inner and outer sides of the cylindrical web segment, each series of flange segments being offset angularly about the inner ring axis of symmetry from the other series of flange segments and the two series of segments being spaced apart axially from each other, the bearing being configured to act on a diaphragm spring of a clutch mechanism;
a control device including a stationary portion a movable portion mounted to move axially relative to the stationary portion and configured to move the bearing relative to the clutch mechanism; and
a protective bellows disposed between the stationary portion and the bearing;
wherein the two series of flange segments define a generally annular space for receiving and for clamping one edge of the bellows, wherein the flange has a bearing zone for a spring exerting an axial force on the inner ring, and wherein the flange bearing zone has a punched-out portion configured to rotationally lock the spring and the flange.

9. The device according to claim 8, wherein the control device includes a control member for controlling the axial position of the bearing, the control member being is mounted in self-centering manner relative to the inner ring.

10. A motor vehicle comprising a bearing including an inner ring having an axis of symmetry, an outer ring, and a plurality of rolling elements disposed between the inner and outer rings, and a flange mounted on the inner ring and including a generally cylindrical web segment with inner and outer sides and two crenellated series of flange segments extending radially from a same one of the inner and outer sides of the cylindrical web segment, each series of flange segments being offset angularly about the inner ring axis of symmetry from the other series of flange segments and the two series of segments being spaced apart axially from each other,
wherein the two series of flange segments define a space configured to receive one edge of a bellows.

* * * * *